(12) United States Patent
Inoue et al.

(10) Patent No.: US 9,536,664 B2
(45) Date of Patent: Jan. 3, 2017

(54) ELECTRONIC COMPONENT

(71) Applicant: Murata Manufacturing Co., Ltd., Nagaokakyo-shi, Kyoto-fu (JP)

(72) Inventors: Noriyuki Inoue, Nagaokakyo (JP); Mayuko Nishihara, Nagaokakyo (JP); Makito Nakano, Nagaokakyo (JP); Masayoshi Shimizu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/045,863

(22) Filed: Oct. 4, 2013

(65) Prior Publication Data
US 2014/0029158 A1    Jan. 30, 2014

Related U.S. Application Data

(63) Continuation of application No. PCT/JP2012/055763, filed on Mar. 7, 2012.

(30) Foreign Application Priority Data

Apr. 7, 2011  (JP) .................... 2011-085122

(51) Int. Cl.
*H01G 4/30*        (2006.01)
*H01G 4/228*       (2006.01)
(Continued)

(52) U.S. Cl.
CPC .............. *H01G 4/005* (2013.01); *H01G 2/065* (2013.01); *H01G 4/0085* (2013.01); *H01G 4/232* (2013.01); *H01G 4/30* (2013.01)

(58) Field of Classification Search
CPC ........ H01G 4/30; H01G 4/1227; H01G 4/232; H01G 4/005; H01G 4/228
(Continued)

(56) References Cited

U.S. PATENT DOCUMENTS

2004/0223290 A1*  11/2004  Sutardja ................. H01G 4/232
                                                    361/306.3
2008/0130198 A1    6/2008  Nakano et al.
(Continued)

FOREIGN PATENT DOCUMENTS

JP          6-69063 A       3/1994
JP          6-283385 A     10/1994
(Continued)

OTHER PUBLICATIONS

Official Communication issued in corresponding Korean Patent Application No. 10-2013-7026318, mailed on Nov. 14, 2014.
(Continued)

*Primary Examiner* — Eric Thomas
*Assistant Examiner* — Arun Ramaswamy
(74) *Attorney, Agent, or Firm* — Keating & Bennett, LLP

(57) ABSTRACT

In an electronic component, capacitor conductors include linear portions parallel or substantially parallel to a lower surface of a laminate, and lead-out portions led out respectively from the linear portions to the lower surface. Outer electrodes are disposed on the lower surface and cover exposed portions where the lead-out portions are exposed at the lower surface, respectively. At least one of the linear portions includes a groove, which is recessed in a direction away from the lower surface, in a region thereof overlapping with the corresponding outer electrode when looking at the electronic component in a plan view from a z-axis direction.

19 Claims, 7 Drawing Sheets

(51) Int. Cl.
    *H01G 4/06*     (2006.01)
    *H01G 4/005*     (2006.01)
    *H01G 2/06*     (2006.01)
    *H01G 4/232*     (2006.01)
    *H01G 4/008*     (2006.01)

(58) Field of Classification Search
    USPC .................... 361/301.4, 321.1, 321.2, 306.1
    See application file for complete search history.

(56) References Cited

U.S. PATENT DOCUMENTS

| | | | |
|---|---|---|---|
| 2010/0188797 A1* | 7/2010 | Yamazaki et al. | 361/303 |
| 2011/0096463 A1* | 4/2011 | Togashi | H01G 4/228 361/306.3 |
| 2011/0096464 A1 | 4/2011 | Togashi et al. | |

FOREIGN PATENT DOCUMENTS

| | | | |
|---|---|---|---|
| JP | 09-045830 A | | 2/1997 |
| JP | 09045830 A | * | 2/1997 |
| JP | 2009-054973 A | | 3/2009 |
| JP | 2009-54974 A | | 3/2009 |
| JP | 2011-91271 A | | 5/2011 |
| JP | 2011-91272 A | | 5/2011 |
| WO | 2007/020757 A1 | | 2/2007 |

OTHER PUBLICATIONS

Official Communication issued in International Patent Application No. PCT/JP2012/055763, mailed on Jun. 12, 2012.
Official Communication issued in corresponding Japanese Patent Application No. 2013-508798, mailed on Jan. 7, 2014.

* cited by examiner

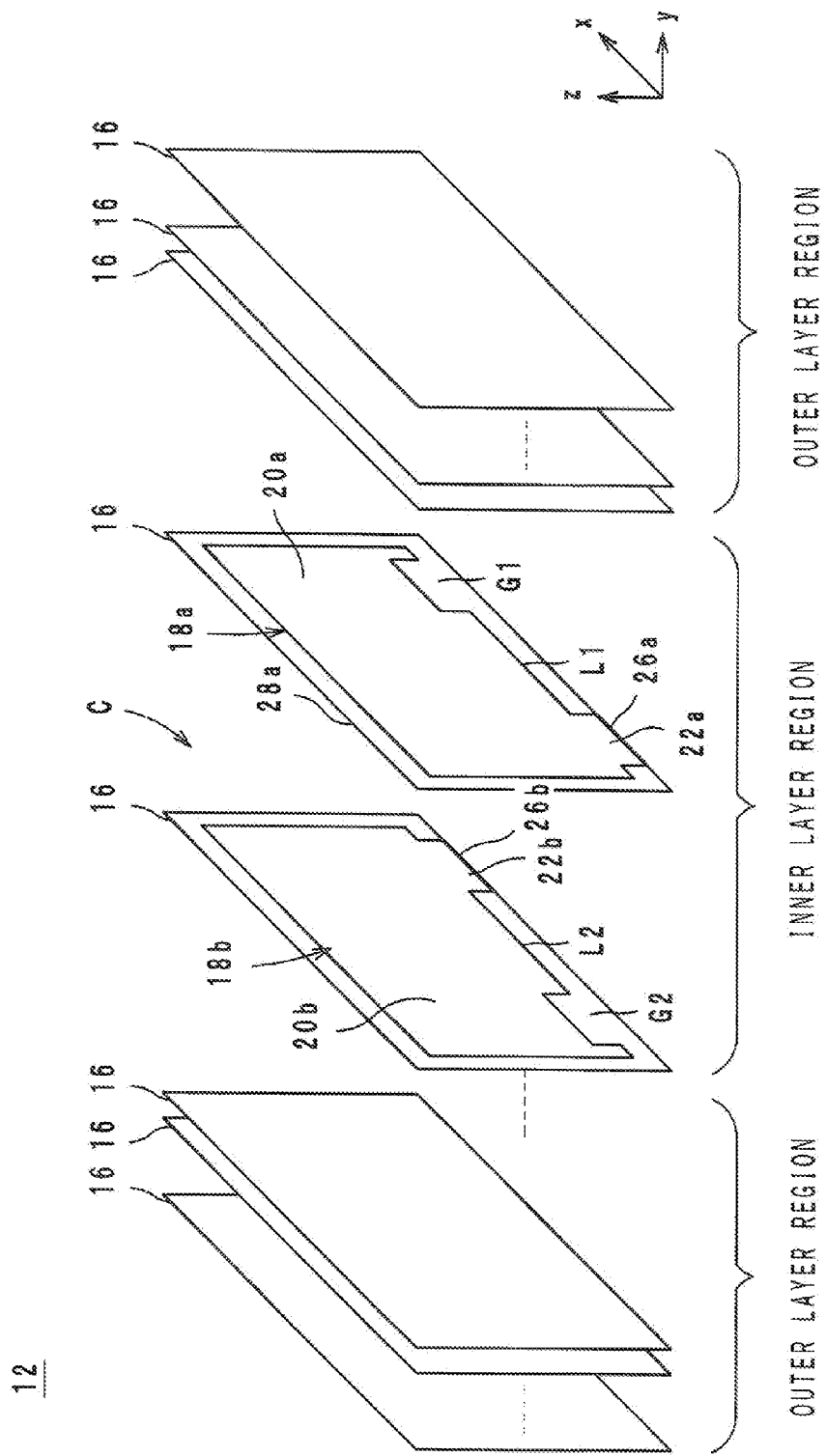

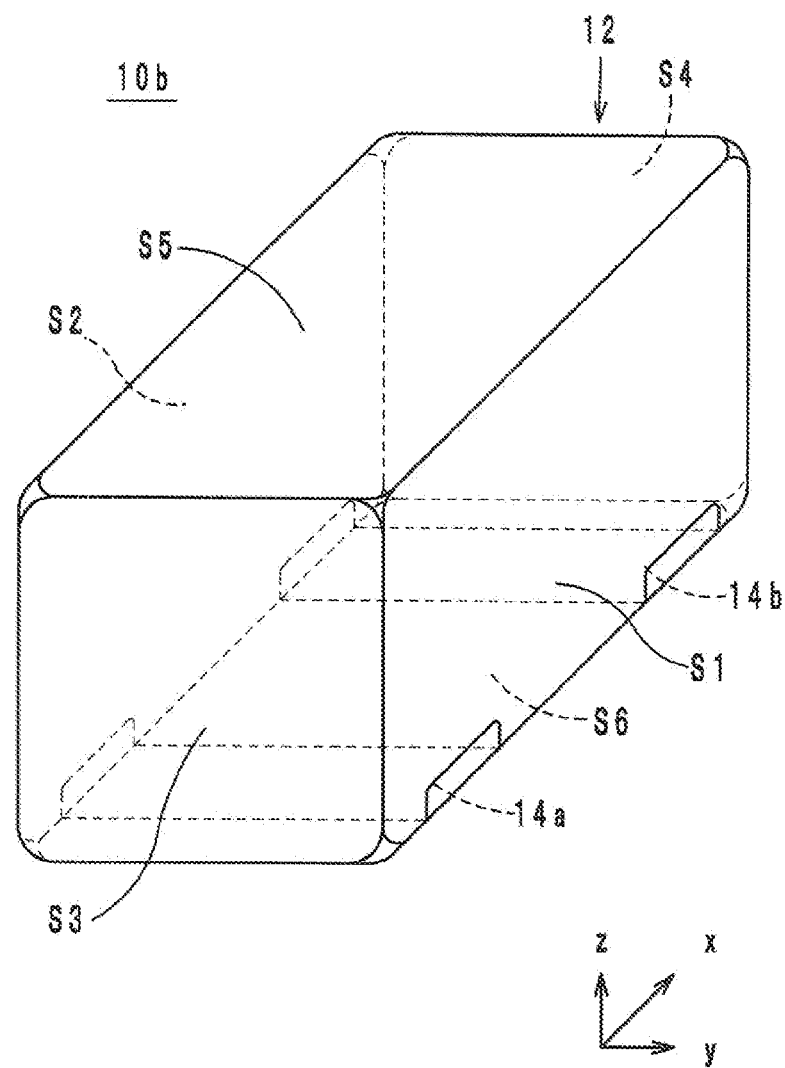

ELECTRONIC COMPONENT

BACKGROUND OF THE INVENTION

1. Field of the Invention

The present invention relates to an electronic component, and more particularly to an electronic component in which dielectric layers and capacitor conductors are stacked.

2. Description of the Related Art

In an electronic component in which dielectric layers and capacitor conductors are stacked, when an AC voltage is applied to the electronic component, electric-field-induced strains are generated in the dielectric layers due to the applied voltage. Those electric-field-induced strains vibrate a substrate on which the electronic component is mounted, thus generating sounds called "vibration noise". As a related-art electronic component aiming to reduce the "vibration noise", there is known a multilayer ceramic capacitor disclosed, for example, in International Publication No. 2007/020757. FIG. 7 is a sectional structural view of a multilayer ceramic capacitor $500a$ disclosed in International Publication No. 2007/020757.

As illustrated in FIG. 7, the multilayer ceramic capacitor $500a$ includes a capacitor body 502, an inner electrode 504, and outer electrodes 506 and 508. The capacitor body 502 is constituted by stacking a plurality of dielectric ceramic layers. The inner electrode 504 has a rectangular shape and constitutes a capacitor by being stacked together with the dielectric ceramic layers. The outer electrodes 506 and 508 cover end surfaces of the capacitor body 502, the surfaces being positioned at both ends thereof in a lengthwise direction. Furthermore, the outer electrodes 506 and 508 have shapes folded to partly extend over lateral surfaces adjoining with the end surfaces of the capacitor body 502.

In the multilayer ceramic capacitor $500a$, cutouts A1-A4 are formed in the inner electrode 504 at respective locations near edges B1-B4 of the outer electrodes 506 and 508 in order to reduce the "vibration noise". With such a structure, the stacked inner electrodes 504 are not positioned opposite to each other in the cutouts A1-A4. Therefore, generation of the electric-field-induced strains in the dielectric ceramic layers is suppressed in regions corresponding to the cutouts A1-A4, and generation of vibrations in the outer electrodes 506 and 508 is also suppressed. As a result, the vibrations are inhibited from being propagated to the substrate through the outer electrodes 506 and 508.

In the multilayer ceramic capacitor $500a$ illustrated in FIG. 7, however, it is difficult to sufficiently reduce the "vibration noise". In more detail, the inner electrode 504 is positioned close to the outer electrodes 506 and 508 in not only the cutouts A1-A4, but also in sides C1-C4 thereof, which are positioned outside the edges B1-B4. Therefore, when the electric-field-induced strains are generated in the dielectric ceramic layers near the sides C1-C4, vibrations are caused in the outer electrodes 506 and 508. Consequently, the "vibration noise" is generated.

International Publication No. 2007/020757 further discloses a multilayer ceramic capacitor $500b$ illustrated in FIG. 8. FIG. 8 is a sectional structural view of the multilayer ceramic capacitor $500b$ disclosed in International Publication No. 2007/020757. It is to be noted that similar constituent elements in the multilayer ceramic capacitor $500b$ to those in the multilayer ceramic capacitor $500a$ are denoted by the same reference signs.

In the multilayer ceramic capacitor $500b$, as illustrated in FIG. 8, the inner electrode 504 has a cross shape. More specifically, the cutouts A1-A4 are formed to extend up to both the ends of the inner electrode 504 in the lengthwise direction thereof. With such a structure, the distance between the inner electrode 504 and each of the outer electrodes 506 and 508 is increased. As a result, even when electric-field-induced strains are generated in the dielectric ceramic layer sandwiched between the inner electrodes 504, generation of vibrations in the outer electrodes 506 and 508 is suppressed. Thus, generation of the "vibration noise" is suppressed.

However, the cutouts A1-A4 of the multilayer ceramic capacitor $500b$ illustrated in FIG. 8 have larger sizes than the cutouts A1-A4 of the multilayer ceramic capacitor $500a$ illustrated in FIG. 7. Accordingly, a capacitance value of the multilayer ceramic capacitor $500b$ is smaller than that of the multilayer ceramic capacitor $500a$.

SUMMARY OF THE INVENTION

Preferred embodiments of the present invention provide an electronic component, which significantly reduces or prevents the "vibration noise" while suppressing reduction of a capacitance value of a capacitor.

According to one preferred embodiment of the present invention, an electronic component includes a laminate including a plurality of stacked dielectric layers and including a mounting surface that is defined by continuously-arranged outer edges of the plural dielectric layers; a first capacitor conductor and a second capacitor conductor stacked together with the dielectric layers in opposed relation to each other, the first capacitor conductor and the second capacitor conductor respectively including a first linear portion and a second linear portion extending along outer edges thereof and parallel or substantially parallel to the mounting surface, the first capacitor conductor and the second capacitor conductor further respectively including a first lead-out portion and a second lead-out portion led out to the mounting surface from the first linear portion and the second linear portion; and a first outer electrode and a second outer electrode disposed on the mounting surface and not disposed on end surfaces of the laminate, which are adjacent to the mounting surface and which are each defined by continuously-arranged outer edges of the plural dielectric layers, the first outer electrode and the second outer electrode covering respective portions of the mounting surface where the first lead-out portion and the second lead-out portion are exposed at the mounting surface, wherein the first linear portion includes a first groove, which is recessed in a direction away from the mounting surface, in a region thereof overlapping with the second outer electrode when looking at the electronic component in a plan view from a direction normal to the mounting surface.

With various preferred embodiments of the present invention, the "vibration noise" is significantly reduced or prevented while reduction of a capacitance value of a capacitor is suppressed or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is an exploded perspective view of a laminate of the electronic component according to a preferred embodiment of the present invention.

FIG. 5 is a perspective view illustrating an external appearance of an electronic component according to a second modification of a preferred embodiment of the present invention.

DETAILED DESCRIPTION OF THE PREFERRED EMBODIMENTS

An electronic component according to preferred embodiments of the present invention will be described below with reference to the drawings.

Figure 1:
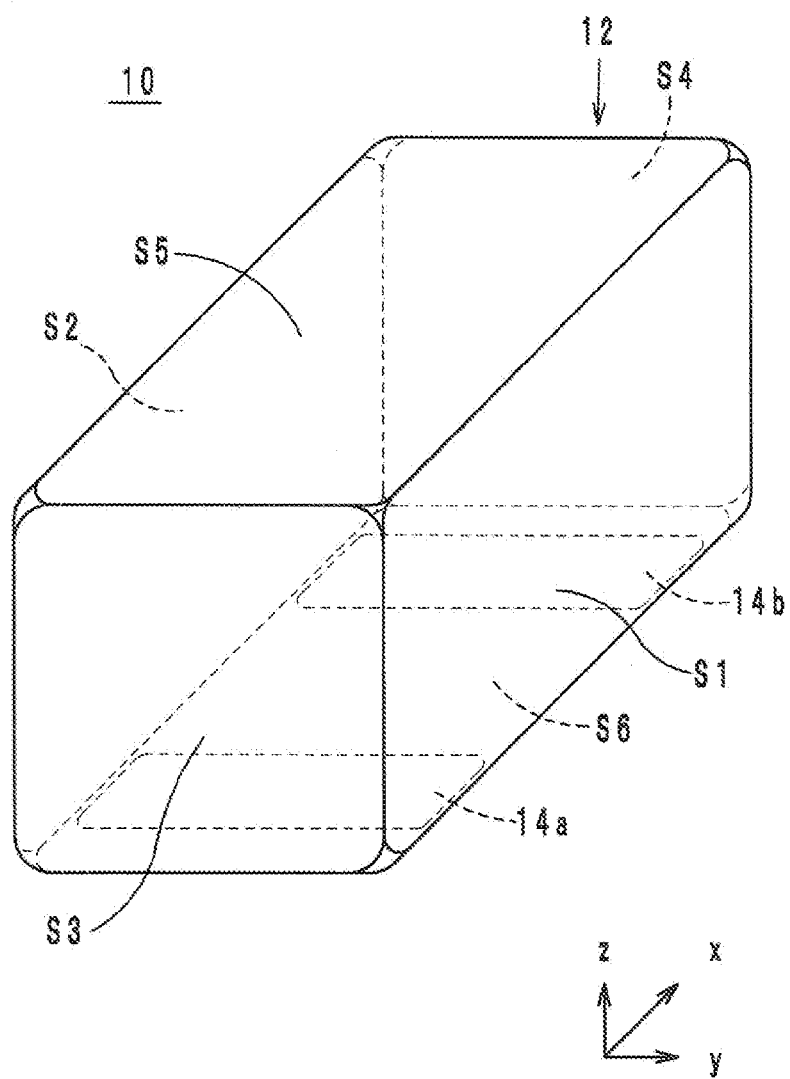
FIG. 1 is a perspective view illustrating an external appearance of an electronic component according to a preferred embodiment of the present invention.
Figure 3A:
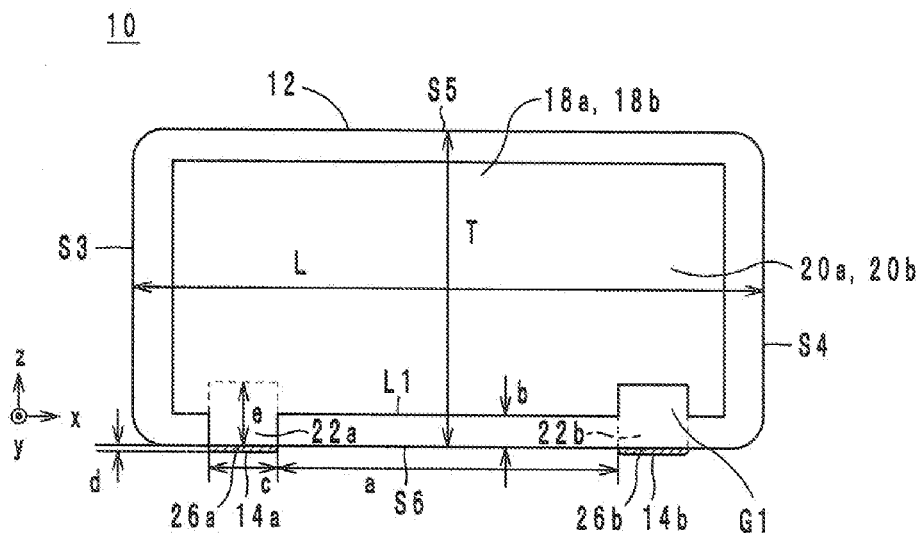
FIGS. 3A and 3B are each a sectional structural view of the electronic component according to a preferred embodiment of the present invention.
Figure 3B:
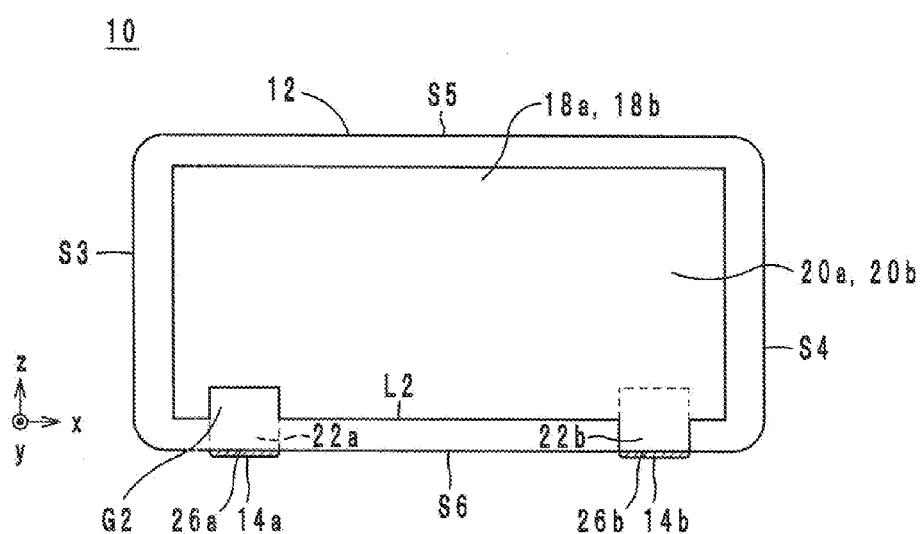

First, the structure of the electronic component is described with reference to the drawings. FIG. 1 is a perspective view illustrating an external appearance of an electronic component 10. FIG. 2 is an exploded perspective view of a laminate 12 of the electronic component 10. FIGS. 3A and 3B are each a sectional structural view of the electronic component 10. In the following description, a stacking direction of the laminate 12 is defined as a y-axis direction. A lengthwise direction of the laminate 12 when looking at the laminate 12 in a plan view from the y-axis direction is defined as an x-axis direction. A widthwise direction of the laminate 12 when looking at the laminate 12 in a plan view from the y-axis direction is defined as a z-axis direction.

The electronic component 10 preferably is a chip capacitor, for example. As illustrated in FIGS. 1 and 2, the electronic component 10 includes the laminate 12, outer electrodes 14 (14a and 14b), and a capacitor C (not illustrated in FIG. 1). The laminate 12 preferably has a rectangular or substantially rectangular parallelepiped shape, for example. However, the laminate 12 preferably is chamfered such that corners and ridges of the laminate 12 are rounded. FIG. 2 illustrates the laminate 12 in a state before the chamfering where corners of dielectric layers 16 are not rounded. In the following description, a surface of the laminate 12, which is positioned on the positive side in the y-axis direction, is denoted by a lateral surface S1, and a surface of the laminate 12, which is positioned on the negative side in the y-axis direction, is denoted by a lateral surface S2. A surface of the laminate 12, which is positioned on the negative side in the x-axis direction, is denoted by an end surface S3, and a surface of the laminate 12, which is positioned on the positive side in the x-axis direction, is denoted by an end surface S4. A surface of the laminate 12, which is positioned on the positive side in the z-axis direction, is denoted by an upper surface S5, and a surface of the laminate 12, which is positioned on the negative side in the z-axis direction, is denoted by a lower surface S6.

The laminate 12 preferably includes a plurality of the dielectric layers 16, which are stacked as illustrated in FIG. 2. Each of the dielectric layers 16 preferably has a rectangular or substantially rectangular shape and is made of a dielectric ceramic, for example. Examples of the dielectric ceramic include $BaTiO_3$, $CaTiO_3$, $SrTiO_3$, and $CaZrO_3$. The dielectric ceramic may contain, as a main ingredient, any of the above-mentioned materials and, as an accessory ingredient, a Mn compound, an Fe compound, a Cr compound, a Co compound, or a Ni compound, for example. The thickness of the dielectric layer 16 is preferably not less than about 0.5 μm and not more than about 10 μm, for example. In the following description, a principal surface of the dielectric layer 16 on the positive side in the y-axis direction is called a front surface, and a principal surface of the dielectric layer 16 on the negative side in the y-axis direction is called a rear surface.

The lateral surface S1 of the laminate 12 is constituted by the front surface of the dielectric layer 16 that is disposed on the most positive side in the y-axis direction. The lateral surface S2 of the laminate 12 is constituted by the rear surface of the dielectric layer 16 that is disposed on the most negative side in the y-axis direction. The end surface S3 of the laminate 12 is constituted by short sides of the plural dielectric layers 16 being positioned on the negative side in the x-axis direction. The end surface S4 of the laminate 12 is constituted by short sides of the plural dielectric layers 16 being continuously positioned on the positive side in the x-axis direction. The upper surface S5 of the laminate 12 is constituted by long sides of the plural dielectric layers 16 being continuously positioned on the positive side in the z-axis direction. The lower surface S6 of the laminate 12 is constituted by long sides of the plural dielectric layers 16 being continuously positioned on the negative side in the z-axis direction. When the electronic component 10 is mounted to a circuit board, the lower surface S6 serves as a mounting surface that is opposed to a principal surface of the circuit board.

The capacitor C is constituted, as illustrated in FIG. 2, by capacitor conductors 18 (18a and 18b) that are stacked together with the dielectric layers 16 and are positioned in opposed relation to each other. Preferably, each of the capacitor conductors 18 is made of a conductive material, e.g., Ni, Cu, Ag, Pd, an Ag—Pd alloy, or Au, and it has a thickness of not less than about 0.3 μm and not more than about 2.0 μm, for example.

The capacitor conductor 18a is disposed on the front surface of the dielectric layer 16, and it includes a capacitance generating portion 20a and a lead-out portion 22a. The capacitance generating portion 20a preferably has a rectangular or substantially rectangular shape and is not contacted with any outer edges of the dielectric layer 16. Because the capacitance generating portion 20a preferably has a rectangular or substantially rectangular shape, an outer edge of the capacitor conductor 18a includes a linear portion L1 parallel or substantially parallel to the lower surface S6, as illustrated in FIG. 2. The linear portion L1 constitutes a long side of the capacitance generating portion 20a on the negative side in the z-axis direction and extends in the x-axis direction.

The lead-out portion 22a projects toward the negative side in the z-axis direction from a position near an end of the linear portion L1 on the negative side in the x-axis direction, such that the lead-out portion 22a is led out to the long side of the dielectric layer 16 on the negative side in the z-axis direction. Thus, the lead-out portion 22a is led out to the lower surface S6. In the following description, a portion where the lead-out portion 22a is exposed at the boundary between two adjacent dielectric layers 16 on the lower surface S6 of the laminate 12 is called an exposed portion 26a.

The capacitor conductor 18b is disposed on the front surface of the dielectric layer 16, and it includes a capacitance generating portion 20b and a lead-out portion 22b. The capacitance generating portion 20b preferably has a rectangular or substantially rectangular shape and is not contacted with any outer edges of the dielectric layer 16. When looking at the capacitance generating portion 20b in a plan view from the y-axis direction, the capacitance generating portion 20b is overlapped with the capacitance generating portion 20a substantially in a matched state. Because the capacitance generating portion 20b preferably has a rectangular or substantially rectangular shape, an outer edge of the capacitor conductor 18b includes a linear portion L2 parallel or substantially parallel to the lower surface S6, as illustrated in FIG. 2. The linear portion L2 constitutes a long side of the capacitance generating portion 20b on the negative side in the z-axis direction and extends in the x-axis direction.

The lead-out portion 22b projects toward the negative side in the z-axis direction from a position near an end of the linear portion L2 on the positive side in the x-axis direction, such that the lead-out portion 22b is led out to the long side of the dielectric layer 16 on the negative side in the z-axis direction. Thus, the lead-out portion 22b is led out to the lower surface S6. The lead-out portion 22b is positioned on the more positive side in the x-axis direction than the lead-out portion 22a. In the following description, a portion where the lead-out portion 22b is exposed at the boundary between two adjacent dielectric layers 16 on the lower surface S6 of the laminate 12 is called an exposed portion 26b.

The capacitor conductors 18a and 18b, constituted as described above, are disposed on the plural dielectric layers 16 such that the capacitor conductors 18a and 18b are alternately arrayed in the y-axis direction in the stacked state. With such an arrangement, the capacitor C is provided in a portion where the capacitor conductor 18a and the capacitor conductor 18b are opposed to each other with the dielectric layer 16 interposed between them. A region where the plural dielectric layers 16 is provided with the capacitor conductors 18 provided thereon is called an inner layer region. The dielectric layers 16 not provided with the capacitor conductors 18 are stacked on the positive side of the inner layer region in the y-axis direction. Similarly, the dielectric layers 16 not provided with the capacitor conductors 18 are further stacked on the negative side of the inner layer region in the y-axis direction. In the following description, those two regions where the plural dielectric layers 16 not provided with the capacitor conductors 18 are stacked are each called an outer layer region.

As illustrated in FIGS. 1, 3A and 3B, the outer electrodes 14a and 14b preferably are directly disposed on the lower surface S6 of the laminate 12 by plating so as to cover the exposed portions 26a and 26b, respectively. In other words, the outer electrodes 14a and 14b are not disposed on the end surfaces S3 and S4 adjacent to the lower surface S6, respectively. The outer electrode 14a is positioned on the more negative side in the x-axis direction than the outer electrode 14b. Furthermore, as illustrated in FIG. 3A, the outer electrode 14a is positioned on the more positive side in the x-axis direction than the short side of the capacitance generating portion 20a on the negative side in the x-axis direction. As illustrated in FIG. 3B, the outer electrode 14b is positioned on the more negative side in the x-axis direction than the short side of the capacitance generating portion 20b on the positive side in the x-axis direction. With the above-described arrangement of the outer electrodes 14, the capacitor C is provided between the outer electrode 14a and the outer electrode 14b. The outer electrodes 14 can be made of Cu, Ni, or Sn, for example.

The electronic component 10 has a structure to reduce the "vibration noise". Details of such a structure will be described below.

As illustrated in FIGS. 2 and 3A, the linear portion L1 includes a groove G1, which is recessed in a direction away from the lower surface S6, in a region overlapping with the outer electrode 14b when looking at the laminate 12 in a plan view from the z-axis direction (i.e., when viewed from a direction normal to the lower surface S6). As illustrated in FIG. 3A, the groove G1 preferably has a rectangular or substantially rectangular shape and has the same or substantially the same width as that of the lead-out portion 22b in the x-axis direction. Thus, the capacitor conductor 18a and the capacitor conductor 18b are not opposed to each other in the groove G1.

As illustrated in FIGS. 2 and 3B, the linear portion L2 includes a groove G2, which is recessed in a direction away from the lower surface S6, in a region overlapping with the outer electrode 14a when looking at the laminate 12 in a plan view from the z-axis direction (i.e., when viewed from the direction normal to the lower surface S6). As illustrated in FIG. 3B, the groove G2 preferably has a rectangular or substantially rectangular shape and has the same or substantially the same width size as that of the lead-out portion 22a in the x-axis direction. Thus, the capacitor conductor 18a and the capacitor conductor 18b are not opposed to each other in the groove G2.

The electronic component 10 having the above-described structure is mounted to the circuit board including lands located on its principal surface. More specifically, the electronic component 10 is mounted to the circuit board preferably by fixedly joining the outer electrodes 14a and 14b to the corresponding lands using solder.

An example of a method of manufacturing the electronic component 10 will be described below with reference to FIGS. 1 to 3B.

First, $BaTiO_3$, $CaTiO_3$, $SrTiO_3$, or $CaZrO_3$ as a main ingredient and a Mn compound, an Fe compound, a Cr compound, a Co compound, or a Ni compound as an accessory ingredient are weighed at a predetermined ratio, put into a ball mill, and mixed together in a wet state. The obtained mixture is dried and pulverized. The obtained powder is calcined. After pulverizing the calcined powder in a wet state using a ball mill, the obtained powder is dried and disintegrated. As a result, dielectric ceramic powder is obtained.

An organic binder and an organic solvent are added to the above-described dielectric ceramic powder, and are mixed together in a ball mill. The obtained ceramic slurry is coated in the form of a sheet over a carrier sheet by the doctor blade method, and then dried. In this way, a ceramic green sheet to serve as the dielectric layer 16 is fabricated. The thickness of the ceramic green sheet to serve as the dielectric layer 16 is preferably about 0.5 μm to about 10 μm, for example.

Next, the capacitor conductors 18a and 18b are each formed by coating a paste, which is made of a conductive material, over the ceramic green sheet going to serve as the dielectric layer 16 by the screen printing method. The paste made of a conductive material is prepared, for example, by adding an organic binder or an organic solvent to metal powder of, e.g., Ni.

Next, the ceramic green sheets to serve as the dielectric layers 16 are stacked, such that a mother laminate in a state not yet fired state is obtained. Thereafter, the not-yet-fired mother laminate is compressed using a hydrostatic press.

Next, the not-yet-fired mother laminate is cut into pieces of a predetermined size, such that the plural laminates 12 in a state not yet fired are obtained. Surfaces of each laminate 12 are subjected to barrel polishing, such that the corners and the ridges of the laminate 12 are chamfered.

Next, the not-yet-fired laminate 12 is fired. The firing temperature is preferably, for example, not lower than about 900° C. and not higher than about 1300° C.

Next, the outer electrodes 14 each preferably including three layers of a Cu plating, a Ni plating, and an Sn plating are preferably formed by the plating method. The electronic component 10 is completed through the above-described steps.

In the electronic component 10 manufactured as described above, the "vibration noise" is significantly reduced or prevented. In more detail, as illustrated in FIGS. 2, 3A and 3B, the linear portions L1 and L2 include the recessed grooves G1 and G2 in the regions overlapping with the outer electrodes 14b and 14a, respectively, when looking at the electronic component in a plan view from the z-axis direction. Therefore, the capacitor conductor 18a and the capacitor conductor 18b are not opposed to each other in the grooves G1 and G2 that are positioned close to the outer electrodes 14a and 14b, respectively. Accordingly, even with an AC voltage applied to the outer electrodes 14a and 14b, the electric-field-induced strains are less apt to generate in the dielectric layers 16 in their regions corresponding to the grooves G1 and G2. As a result, generation of vibrations in the outer electrodes 14a and 14b is significantly reduced or prevented, and the vibrations are inhibited from being propagated to the circuit board through the outer electrodes 14a and 14b. Hence generation of the "vibration noise" is significantly reduced or prevented.

Furthermore, according to the electronic component 10, reduction of a capacitance value the capacitor C can be suppressed or prevented even with the reduction of the "vibration noise". In more detail, in the electronic component 10, the outer electrodes 14a and 14b are disposed on the lower surface S6 serving as the mounting surface, and they are not disposed on the end surfaces S3 and S4. In the electronic component 10, therefore, each of portions where the outer electrodes 14a and 14b are opposed to the linear portions L1 and L2, respectively, has a relatively small width in the x-axis direction. Accordingly, the width of each of the grooves G1 and G2 in the x-axis direction is also relatively small in the electronic component 10. As a result, it is possible to reduce an amount by which an area of the capacitor conductor 18 is reduced with the provision of each of the grooves G1 and G2. Hence, in the electronic component 10, the reduction of the capacitance value of the capacitor C can be suppressed or prevented even with the reduction or prevention of the "vibration noise".

Moreover, in the electronic component 10, the outer electrodes 14a and 14b preferably are disposed only on the lower surface S6. Therefore, when the electronic component 10 is mounted to the circuit board using solder, fillets are not formed on the lateral surfaces S1 and S2 and the end surfaces S3 and S4 of the electronic component 10. Accordingly, even when the electronic component 10 vibrates in the z-axis direction, vibrations perpendicular or substantially perpendicular to the z-axis direction are less apt to propagate to the circuit board. As a result, the "vibration noise" is significantly reduced or prevented in the electronic component 10.

First Modification of Preferred Embodiments

Figure 4A:
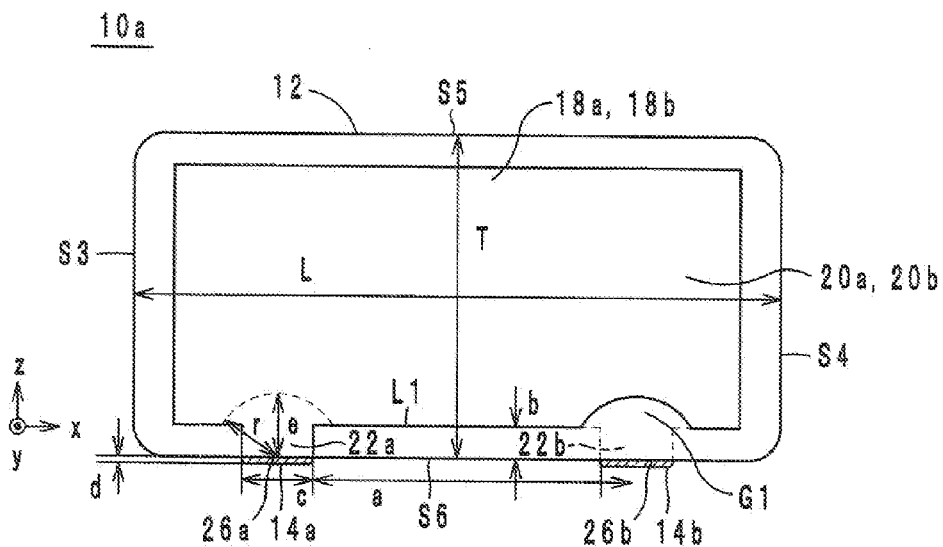
FIGS. 4A and 4B are each a sectional structural view of an electronic component according to a first modification of a preferred embodiment of the present invention.
Figure 4B:
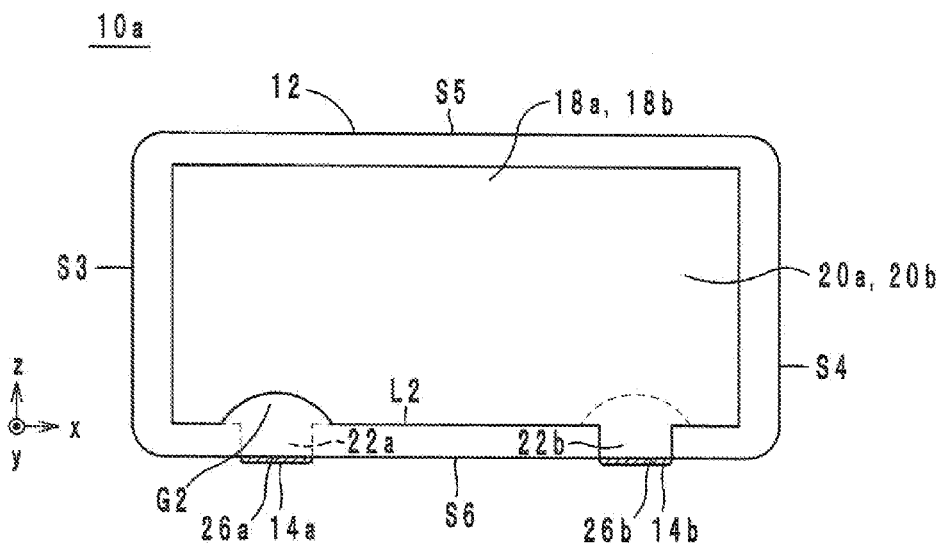

An electronic component 10a according to a first modification of a preferred embodiment of the present invention will be described below with reference to the drawings. FIGS. 4A and 4B are each a sectional structural view of the electronic component 10a according to the first modification.

In the electronic component 10 described above, the grooves G1 and G2 preferably have a rectangular or substantially rectangular shape. On the other hand, in the electronic component 10a, the grooves G1 and G2 preferably have a circular or substantially circular arc shape. More specifically, the grooves G1 and G2 preferably have a circular or substantially circular arc shape having a radius r with centers correspond to midpoints of the exposed portions 26b and 26a in the x-axis direction, respectively. In the electronic component 10a including the grooves G1 and G2 described above, the "vibration noise" can be reduced while the reduction of the capacitance value of the capacitor is suppressed or prevented, as in the electronic component 10.

Second Modification of Preferred Embodiments

An electronic component 10b according to a second modification of a preferred embodiment of the present invention will be described below with reference to the drawings. FIG. 5 is a perspective view illustrating an external appearance of the electronic component 10b according to the second modification.

In the electronic component 10 described above, the outer electrodes 14a and 14b preferably are disposed only on the lower surface S6, and they are not disposed on the lateral surfaces S1 and S2 and the end surfaces S3 and S4. On the other hand, in the electronic component 10b, the outer electrodes 14a and 14b are disposed in shapes extending not only over the lower surface S6, but also partly over the lateral surfaces S1 and S2 by being folded at corners. Even with the outer electrodes 14a and 14b being folded to partly extend over the lateral surfaces S1 and S2, the widths of the regions in the x-axis direction where the outer electrodes 14a and 14b are opposed to the linear portions L1 and L2, respectively, are not changed. Accordingly, in the electronic component 10b, the "vibration noise" is significantly reduced or prevented while the reduction of the capacitance value of the capacitor C is suppressed or prevented, as in the electronic component 10.

Furthermore, in the electronic component 10b, since the outer electrodes 14a and 14b are folded to partly extend over the lateral surfaces S1 and S2, fillets are formed on portions of the outer electrodes 14a and 14b, the portions being positioned on the lateral surfaces S1 and S2, when the electronic component 10b is mounted to the circuit board using solder. As a result, the electronic component 10b can be firmly fixed to the circuit board.

Experiments

Figure 6A:
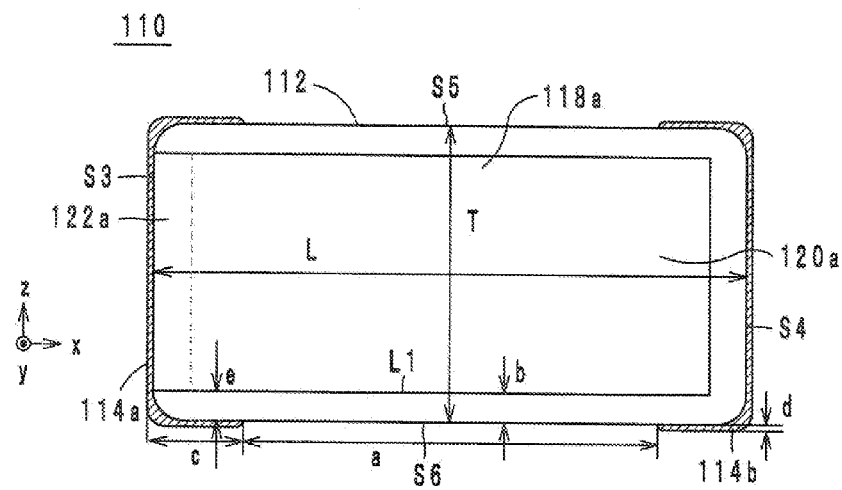
FIGS. 6A and 6B are each a sectional structural view of an electronic component according to Comparative Example.
Figure 6B:
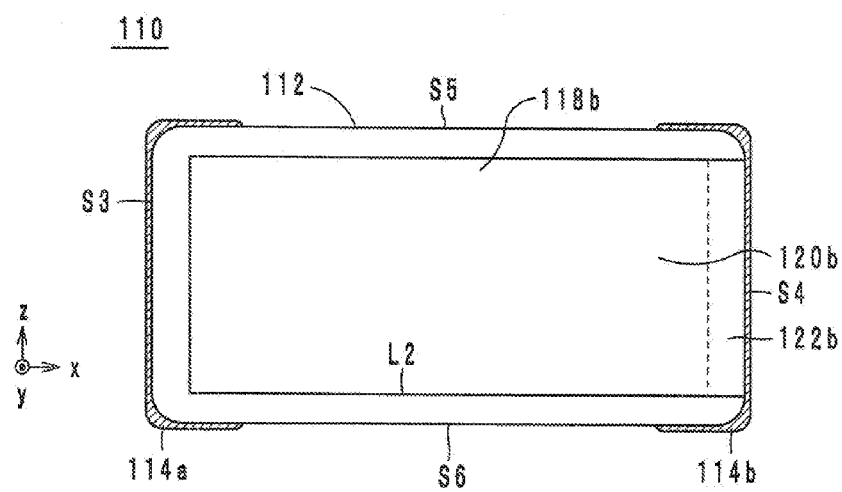
Figure 7:
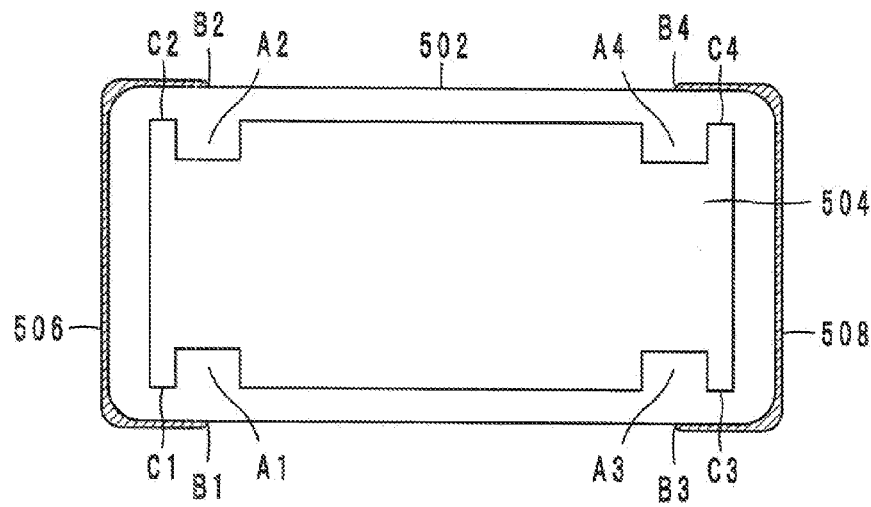
FIG. 7 is a sectional structural view of a multilayer ceramic capacitor disclosed in International Publication No. 2007/020757.
Figure 8:
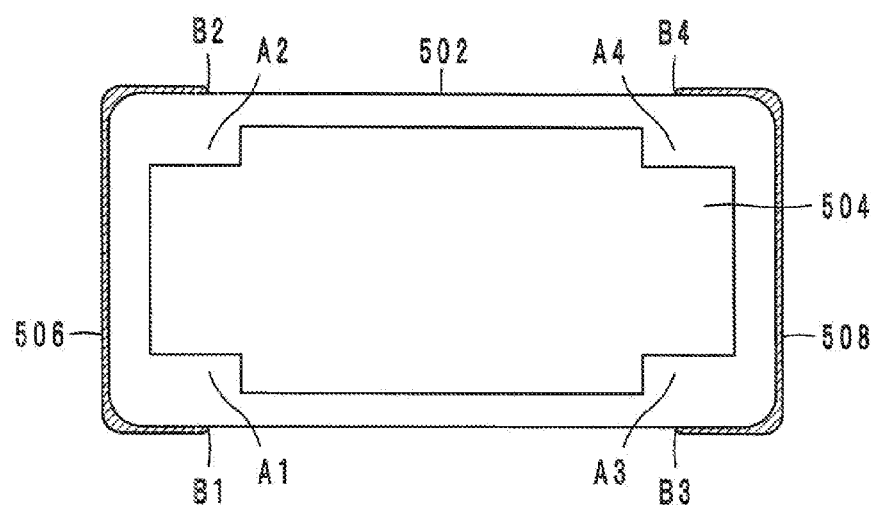
FIG. 8 is a sectional structural view of a multilayer ceramic capacitor disclosed in International Publication No. 2007/020757.

In order to further clarify and confirm the advantageous effects of the electronic components 10, 10a and 10b constituted as described above, the inventor of this application conducted non-limiting experiments as follows. FIGS. 6A and 6B are each a sectional structural view of an electronic component 110 according to a Comparative Example. The same constituent elements in the electronic component 110 as those in the electronic component 10 are denoted by adding 100 to corresponding reference signs used for the electronic component 10.

In the electronic component 110, outer electrodes 114a and 114b are disposed in shapes extending not only over the end surfaces S3 and S4, respectively, but also partly over the lateral surfaces S1 and S2, the upper surface S5, and the lower surface S6, which are adjacent to the end surfaces S3 and S4, by being folded at corners. Lead-out portion 122a and 122b are led out to the end surfaces S3 and S4, respectively.

The inventor of this application fabricated first through eighteenth samples each having the structure of FIG. 3, nineteenth through twenty-second samples each having the structure of FIG. 4, and twenty-third and twenty-fourth samples each having the structure of FIG. 6. The fourteenth sample was fabricated by applying the structure illustrated in FIG. 5 to the outer electrodes 14. Stated in another way, in the fourteenth sample, the outer electrodes 14 had the shapes folded to partly extend over the lateral surfaces S1 and S2 by a distance of about 100 μm, for example. Table 1 lists dimensions of various portions of the first to twenty-fourth samples.

TABLE 1

| Sample | L (μm) | a (μm) | b (μm) | c (μm) | d (μm) | e (μm) | r (μm) | e − b (μm) | e/a |
|---|---|---|---|---|---|---|---|---|---|
| 1 | 3200 | 2000 | 100 | 400 | 5 | 100 | 0 | 0 | 0.05 |
| 2 | 3200 | 2000 | 130 | 400 | 5 | 100 | 0 | −30 | 0.05 |
| 3 | 3200 | 2000 | 100 | 400 | 5 | 180 | 0 | 80 | 0.09 |
| 4 | 3200 | 1200 | 100 | 400 | 5 | 180 | 0 | 80 | 0.15 |
| 5 | 3200 | 600 | 100 | 400 | 5 | 180 | 0 | 80 | 0.30 |
| 6 | 3200 | 400 | 100 | 400 | 5 | 180 | 0 | 80 | 0.45 |
| 7 | 3200 | 200 | 100 | 400 | 5 | 200 | 0 | 100 | 1.00 |
| 8 | 3200 | 400 | 50 | 400 | 5 | 40 | 0 | −10 | 0.10 |
| 9 | 3200 | 1300 | 130 | 500 | 5 | 150 | 0 | 20 | 0.12 |
| 10 | 3200 | 1300 | 130 | 500 | 5 | 200 | 0 | 70 | 0.15 |
| 11 | 3200 | 1300 | 130 | 500 | 5 | 300 | 0 | 170 | 0.23 |
| 12 | 3200 | 1300 | 130 | 500 | 5 | 400 | 0 | 270 | 0.31 |
| 13 | 3200 | 1800 | 50 | 700 | 5 | 150 | 0 | 100 | 0.08 |
| 14 | 3200 | 2000 | 50 | 500 | 5 | 250 | 0 | 200 | 0.13 |
| 15 | 3200 | 2200 | 50 | 200 | 5 | 400 | 0 | 350 | 0.18 |
| 16 | 3200 | 1800 | 100 | 300 | 1 | 300 | 0 | 200 | 0.17 |
| 17 | 3200 | 1800 | 100 | 300 | 10 | 300 | 0 | 200 | 0.17 |
| 18 | 3200 | 1800 | 100 | 300 | 100 | 300 | 0 | 200 | 0.17 |
| 19 | 3200 | 1000 | 60 | 400 | 5 | 300 | 300 | 240 | 0.30 |
| 20 | 3200 | 1000 | 60 | 400 | 5 | 500 | 500 | 440 | 0.50 |
| 21 | 3200 | 1000 | 60 | 400 | 5 | 600 | 600 | 540 | 0.60 |
| 22 | 3200 | 1000 | 60 | 400 | 5 | 700 | 700 | 640 | 0.70 |
| 23 | 3200 | 2800 | 100 | 200 | 50 | 100 | 0 | 0 | 0.04 |
| 24 | 3200 | 2800 | 100 | 200 | 50 | 100 | 0 | 0 | 0.04 | a: spacing between the outer electrode 14a, 114a and the outer electrode 14b, 114b
b: spacing between region of the linear portion L1, L2 other than the groove G1, G2 and the lower surface S6
c: width of the outer electrode 14, 114 in the x-axis direction
d: thickness of the outer electrode 14, 114
e: distance from the lower surface S6 to the bottom of the groove G1, G2
L: length of the electronic component 10, 10a, 10b, 110 in the x-axis direction In Table 1, the first, twenty-third, and twenty-fourth samples in which (e-b) takes 0 imply that the grooves G1 and G2 are not formed. Furthermore, the second and eighth samples in which (e-b) takes a negative value imply that the portions of the capacitor conductors 18 where the grooves G1 and G2 are to be formed project toward the negative side in the z-axis direction.

In each of the samples, the number of dielectric layers 16 or 116 was set to the range of 200 to 400. The thickness of each dielectric layer 16 or 116 was set to 2 μm. The thickness of each capacitor conductor 18 or 118 was set to 1 μm. Ni was used as the material of each capacitor conductor 18 or 118. Cu was used as the material of each outer electrode 14 or 114.

The inventor of this application mounted each sample at a center of a circuit board made of a glass epoxy resin by employing Sn—Pd eutectic solder. The circuit board had a size of 100 mm×40 mm×0.8 mm. Furthermore, the inventor of this application applied, to each sample, a voltage that was prepared by superimposing an AC voltage, having an amplitude of 1 V and a frequency of 5 kHz, on a DC voltage of 5 V, and evaluated the pressure of sounds generated from the circuit board by employing a sound collecting microphone with super-directivity (made by ALC Co., Product No. KM-358 microphone). In addition, the inventor of this application measured a capacitance value of each sample. Table 2 lists the experimental results.

| Sample | Capacitance μF | Sound Pressure dB |
|---|---|---|
| 1 | 22.0 | 43 |
| 2 | 22.1 | 46 |
| 3 | 21.7 | 38 |
| 4 | 21.7 | 34 |
| 5 | 21.7 | 30 |
| 6 | 21.7 | 29 |
| 7 | 21.6 | 29 |
| 8 | 22.0 | 40 |
| 9 | 21.9 | 36 |
| 10 | 21.6 | 34 |
| 11 | 21.1 | 29 |
| 12 | 20.6 | 24 |
| 13 | 21.3 | 38 |
| 14 | 21.0 | 36 |
| 15 | 21.3 | 35 |
| 16 | 21.4 | 34 |
| 17 | 21.4 | 34 |
| 18 | 21.4 | 35 |
| 19 | 21.5 | 34 |
| 20 | 21.0 | 30 |
| 21 | 20.6 | 28 |
| 22 | 20.2 | 24 |
| 23 | 22.0 | 45 |
| 24 | 22.0 | 45 |

As seen from Table 2, the sound pressure is not lower than 40 dB in the first, second, eighth, twenty-third, and twenty-fourth samples in which the grooves G1 and G2 are not formed, whereas the sound pressure is not higher than 38 dB in the other samples in which the grooves G1 and G2 are formed. It is hence understood that significant reduction of the "vibration noise" can be realized with the provision of the grooves G1 and G2.

Furthermore, the inventor of this application examined the relationship between a ratio of (e/a) and the sound pressure in the samples having the sound pressure of not higher than about 38 dB, for example. The examination results show that the sound pressure is about 38 dB in the third and thirteenth samples in which (e/a) is about 0.09 and about 0.08, respectively, whereas the sound pressure is not higher than 36 dB in the samples in which (e/a) is not less than about 0.10, for example. It is hence understood that (e/a) is desirably not less than about 0.10, for example.

In the fourteenth sample, although the outer electrodes 14 having the structure illustrated in FIG. 5 are used, the sound pressure is about 36 dB and a good result is obtained. It is hence understood that the outer electrodes 14 may have the shape folded to partly extend over the lateral surfaces S1 and S2. Additionally, the inventor of this application conducted a similar experiment on the condition that the outer electrodes 14 were formed in shapes folded to partly extend over the end surfaces S3 and S4 by a distance of about 100 µm, for example. As a result, the sound pressure was about 43 dB, for example. Accordingly, it is preferable that the outer electrodes 14 have the shapes not folded to partly extend over the end surfaces S3 and S4. The reason is as follows.

When the outer electrodes 14 have the shapes folded to partly extend over the lateral surfaces S1 and S2, fillets are formed on the lateral surfaces S1 and S2, and the electronic component is fixed at the lateral surfaces S1 and S2 to the circuit board. On the other hand, when the outer electrodes 14 have the shapes folded to partly extend over the end surfaces S3 and S4, fillets are formed on the end surfaces S3 and S4, and the electronic component is fixed at the end surfaces S3 and S4 to the circuit board. The spacing between the lateral surfaces S1 and S2 is shorter than that between the end surfaces S3 and S4. Therefore, the sample is less apt to flex when the electronic component is fixed at the lateral surfaces S1 and S2 than when it is fixed at the end surfaces S3 and S4. As a result, vibration of the sample in the z-axis direction is more effectively reduced or prevented when the electronic component is fixed at the lateral surfaces S1 and S2 than when it is fixed at the end surfaces S3 and S4.

In addition, (e-b) is preferably not less than about 20 µm, for example.

As described above, preferred embodiments of the present invention are usefully applicable to various electronic components. In particular, preferred embodiments of the present invention are advantageous in that the "vibration noise" is significantly reduced or prevented while the reduction of the capacitance value of the capacitor is suppressed or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a laminate including a plurality of stacked dielectric layers and a mounting surface defined by continuously-arranged outer edges of the plurality of dielectric layers;
a first capacitor conductor and a second capacitor conductor stacked together with the dielectric layers in opposed relation to each other, the first capacitor conductor and the second capacitor conductor respectively including a first outer edge and a second outer edge, the first outer edge including a first linear portion which extends along a first single line and a first groove and the second outer edge including a second linear portion which extends along a second single line and a second groove, the first and second linear portions extending parallel or substantially parallel to the mounting surface, the first capacitor conductor and the second capacitor conductor further respectively including a first lead-out portion and a second lead-out portion led out in a direction towards the mounting surface from the first linear portion and the second linear portion; and
a first outer electrode disposed on the mounting surface, and a second outer electrode disposed on the mounting surface and not disposed on end surfaces of the laminate, which are adjacent to the mounting surface and which are each defined by continuously-arranged outer edges of the plurality of dielectric layers, the second outer electrode covering a portion where the second lead-out portion is exposed at the mounting surface; wherein
the first groove is recessed from the first linear portion in a direction away from the mounting surface, in a region thereof overlapping with the second outer electrode when looking at the electronic component in a plan view from a direction normal to the mounting surface; and
a value resulting from dividing a distance from the mounting surface to a bottom of the first groove by a spacing between the first outer electrode and the second outer electrode is not less than about 0.10.

2. The electronic component according to claim 1, wherein the second groove is recessed from the second linear portion in the direction away from the mounting surface, in a region thereof overlapping with the first outer electrode when looking at the electronic component in a plan view from a direction in which the first led-out portion is led out.

3. The electronic component according to claim 1, wherein the distance from the mounting surface to the bottom of the first groove is larger than a distance from the mounting surface to a region of the first linear portion other than the first groove by about 20 µm or more.

4. The electronic component according to claim 1, wherein the electronic component is a chip capacitor.

5. The electronic component according to claim 1, wherein the laminate has a rectangular or substantially rectangular parallelepiped shape.

6. The electronic component according to claim 1, wherein the laminate is chamfered to include rounded corners and ridges.

7. The electronic component according to claim 1, wherein each of the dielectric layers is made of a dielectric ceramic including at least one of $BaTiO_3$, $CaTiO_3$, $SrTiO_3$, and $CaZrO_3$ and an accessory ingredient including at least one of a Mn compound, an Fe compound, a Cr compound, a Co compound, and a Ni compound.

8. The electronic component according to claim 1, wherein each of the dielectric layers has a thickness of not less than about 0.5 µm and not more than about 10 µm.

9. The electronic component according to claim 1, wherein each of the first and second capacitor conductors is made of a conductive material including at least one Ni, Cu, Ag, Pd, an Ag—Pd alloy, and Au.

10. The electronic component according to claim 1, wherein each of the first and second capacitor conductors has a thickness of not less than about 0.3 µm and not more than about 2.0 µm.

11. The electronic component according to claim 1, wherein each of the first and second capacitor conductors includes a capacitance generating portion that has a rectangular or substantially rectangular shape and is not contacted with any outer edges of the dielectric layers.

12. The electronic component according to claim 1, wherein the first groove has a rectangular or substantially rectangular shape and has the same or substantially the same width as that of the first lead-out portion.

13. The electronic component according to claim 1, wherein the first capacitor conductor and the second capacitor conductor are not opposed to each other in the first groove.

14. The electronic component according to claim 2, wherein the second groove has a rectangular or substantially rectangular shape and has the same or substantially the same width as that of the second lead-out portion.

15. The electronic component according to claim 2, wherein the first capacitor conductor and the second capacitor conductor are not opposed to each other in the second groove.

16. The electronic component according to claim 2, wherein the first and second grooves each have a circular or substantially circular arc shape.

17. The electronic component according to claim 1, wherein the first and second outer electrodes are disposed only on a lower surface of the laminate and are not disposed on lateral surfaces and end surfaces of the laminate.

18. The electronic component according to claim 1, wherein the first and second outer electrodes are disposed on a lower surface of the laminate and are partly disposed on lateral surfaces of the laminate by being folded at corners thereof.

19. The electronic component according to claim 1, wherein the first capacitor conductor and the second capacitor conductor are disposed on different ones of the plurality of stacked dielectric layers.

\* \* \* \* \*